3,349,064
POLYMERIZATION AND COPOLYMERIZATION OF ETHYLENE USING HALOGEN-CONTAINING PROMOTERS
Albert Gumboldt and Ernst Junghanns, Frankfurt am Main, Gerhard Schleitzer, Hofheim, Taunus, and Hans Dieter Stemmer, Hattersheim (Main), Germany, assignors to Hercules Incorporated, a corporation of Delaware
No Drawing. Filed Sept. 11, 1963, Ser. No. 308,075
10 Claims. (Cl. 260—80.7)

The present invention relates to a process for the polymerization of ethylene, and, more particularly, it relates to a process for the homopolymerization of ethylene and for the copolymerization of ethylene with other ethylenically unsaturated hydrocarbons.

It is known to homopolymerize ethylene and to copolymerize ethylene with other ethylenically unsaturated hydrocarbons in an inert organic diluent in the presence of a catalyst prepared by reacting a vanadium compound soluble in the organic diluent with an organoaluminum compound. The homopolymers obtained according to such processes are predominantly crystalline polymers while the copolymers that contain a substantial content of a second monomer are predominantly amorphous.

It has been experienced, however, that the aforesaid vanadium-containing catalysts have a relatively short catalytic life and relatively low efficiency, i.e., the amount of polymer produced per unit of vanadium is relatively low. Further, it has been found that when using these catalysts in solution polymerization the degree of conversion of monomer into polymer depends not only upon the concentration of active catalyst but also upon the viscosity of the polymerization solution that is formed, i.e., monomer mobility is hindered in polymer solutions with higher solids content so that during the polymerization lower conversion of monomer into polymer is obtained as the concentration of the polymer solution increases.

It has now been found that homopolymers of ethylene and copolymers of ethylene with other ethylenically unsaturated hydrocarbons can be prepared advantageously by polymerization in an inert organic diluent using catalysts which are obtained by reaction of a vanadium compound soluble in an inert organic solvent with an organoaluminum compound in the presence of a halogen-containing, unsaturated carbocyclic compound, hereinafter termed "halogen-containing promoter."

The halogen-containing promoters useful in the invention are more particularly defined as unsaturated carbocyclic compounds containing at least 4 halogen atoms, at least 2 of which are attached to doubly bonded carbon atoms and at least 1 of which is attached to a singly bound carbon atom alpha to the double bond. Examples of such compounds are hexachlorocyclopentadiene, 2,2,3,4,5,5-hexachlorocyclopentene, 2,3,4,5-tetrachloro-2,5 - dibromocyclopentene, 1,2,3,4,7,7 - hexachlorobicyclo(2,2,1)-heptadiene-2,5, hexachlorocyclopentene-2-one, hexachlorocyclopentene-3-one, and related compounds in which bromine is substituted for chlorine, or vice versa.

The presence of the halogen-containing promoter, which is the novel feature of the invention, is responsible for several important advantages. One advantage is that the activity of the catalyst is vastly increased. This increase in activity is so great, in fact, that the rate of polymerization in a solution process decreases to a much smaller extent with increasing solids content of the polymer solution than without the presence of the halogen-containing promoter. A further advantage is that catalyst efficiency is remarkably improved so that it is possible to use less vanadium compound per unit weight of polymer. Still another advantage is that the process of the invention, when applied to copolymerization, leads to more uniform reaction of the monomers and hence to copolymers of greater chemical uniformity.

In addition to the homopolymerization of ethylene, the invention can be used to copolymerize ethylene with 1 or more α-olefins such as propylene, butene-1, pentene-1, hexene-1, 4-methylpentene-1, 5,5-dimethylhexene-1, styrene, α-methylstyrene, allylbenzene, hexadiene-1,5, heptadiene-1,5, 11-ethyltridecyldiene-1,10, dicyclopentadiene, cyclooctadiene, and the like. The copolymers of particular value which can be prepared according to the invention are copolymers of ethylene and propylene, and copolymers of ethylene, propylene, and one of the diolefins mentioned above, such as dicyclopentadiene.

Aside from the presence of the halogen-containing promoter, the process of the invention is carried out by established techniques. Thus, the diluents which can be used in the process are also well known and include such compounds as heptane, benzene, toluene, chlorobenzene, cyclohexane, carbon tetrachloride, tetrachloroethylene, trifluoroethane, and the like.

Suitable vanadium catalyst components useful in the invention are vanadium halides, such as VOCl$_3$ or VCl$_4$, and also addition complexes of these vanadium halides with oxygen- or nitrogen-containing ligands, i.e., compounds like VOCl$_3$-tetrahydrofuran or vanadium tetrachloride-bispyridine can be used. It is also possible to use chelate complexes of vanadium with 1,3-dioxo compounds of the general formula

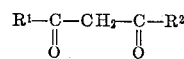

(where R$^1$ and R$^2$ are unsubstituted and/or substituted alkyl residues with 1–4 C-atoms, or phenyl), e.g., with compounds such as acetylacetone, benzoylacetone, or acetoacetic ester. These chelate complexes can be derived from 3-, 4-, or 5-valent vanadium, and in the complex not only the 1,3-dioxo component alone can be bound to the vanadium, but also halogen and/or oxygen atoms. Examples thereof are: diacetylacetone vanadium-IV-oxide, acetoacetic ester-vanadium-V-oxydichloride, tribenzoylacetone vanadium-III. Finally, suitable catalyst components are also vanadium halides soluble in organic solvents, in which the halogen atoms, in particular of VCl$_4$ or of VOCl$_3$, are substituted completely or partially by alkoxy- or aroxy groups such as, e.g., the butyl ester of o-vanadic acid or ethoxyvanadium-V-oxydichloride.

Organoaluminum compounds which can be used are: aluminum trialkyls, alkylaluminum dihalides, dialkylaluminum halides, and mixtures of these alkylaluminum halides, in which the alkyl groups can comprise 1–8 carbon atoms and halide includes fluorides, chlorides, and bromides. It is also possible to use triphenylaluminum.

The homopolymerization of ethylene according to the invention can be carried out either in solution or in suspension depending upon the temperature employed, while copolymerization is usually carried out in solution since the copolymers in most instances are soluble in the reaction dilent. The process can be carried out as a batch process or as a continuous process and at normal atmospheric pressure or under elevated or reduced pressures. Normally, pressures of 1–10 atmospheres are preferred. The polymerization temperature can vary considerably but will normally range from room temperature to about 150° C.

In carrying out the polymerization, the vanadium compound, organoaluminum compound, and the halogen-containing promoter, each in the form of a solution in the polymerization diluent, can be added separately to the polymerization reaction as the reaction proceeds. Alternatively, one of the catalyst components or the halogen-containing promoter, or both, can be added at the outset of the polymerization together with one or more of the monomers to be polymerized, while the remaining catalyst component is added during the course of the reaction. Another procedure comprises mixing the organoaluminum compound and halogen-containing promoter in the polymerization diluent and adding this mixture to the polymerizer simultaneously with a solution of the vanadium compound. It is also possible to start the polymerization in the presence of the vanadium compound and the organoaluminum compound and to increase the catalyst activity at a later time by the addition of the hydrogen-containing promoter.

The polymer that is formed can be separated from the diluent by known procedures. For instance, the polymer solution or slurry, as the case may be, can be extracted with water and the diluent removed by steam distillation. In the case of polymer solutions, the polymer can be precipitated by the addition of acetone or a similar non-solvent.

The invention will now be illustrated by the following examples in which parts and percentages are by weight unless otherwise specified.

*Example 1*

Dry n-heptane, 1.8 l., is placed with exclusion of air and moisture in a glass reaction vessel provided with 3 dropping funnels, a reflux condenser connected with a relief pressure valve and a gas feed tube. The n-heptane is heated to 30° C. and is saturated while stirring with a gas mixture consisting of 3 parts by volume of ethylene and 7 parts by volume of propylene. After that 0.45 ml. (2 mmoles) of ethylaluminum sesquichloride (an equimolar mixture of diethylaluminum chloride and ethylaluminum dichloride) and 3.2 ml. (20 mmoles) of hexachlorocyclopentadiene are added to the heptane and the gas supply is turned off. Then solutions of 0.9 ml. (4 mmoles) of ethylaluminum sesquichloride and 0.5 mmole of the ethyl ester of dichloro-o-vanadic acid

[$OV(OC_2H_5)Cl_2$]

and 3.2 ml. (20 mmoles) of the hexachlorocyclopentadiene, each in 100 ml. of n-heptane, are added uniformly to the polymerization liquor over a period of 100 minutes. After beginning of the polymerization, noticeable by the diminished pressure occurring in the apparatus, the polymerization gas (ethylene/propylene, volume ratio 2/1) is again introduced.

The polymerization is carried out without exhaust gas and the gas feed is regulated so that the mercury relief pressure valve indicates no fluctuations higher than +5 and −10 mm. Hg. After two hours the polymerization reaction is interrupted by addition of 500 ml. of water and simultaneous passing through of nitrogen. The mass is heated to 60° C. and stirred a total of five times with 500 ml. of water for the removal of catalyst residues. Then the copolymer formed is precipitated by addition of acetone and washed once with acetone. The comminuted product is dried under a pressure of 200 mm. at 50–60° C. In this way, 230 g. of copolymer with a reduced specific viscosity of 2.1, measured at 135° in a 0.1% solution of decahydronaphthalene, are obtained. According to infrared-spectroscopic examinations, the copolymer contains 62 mole percent of ethylene and 38 mole percent of propylene.

*Vulcanization.*—In a 0.5 l. laboratory mixer, 50 parts by weight of commercial HAF carbon black are mixed for 20 minutes without heating or cooling with 100 parts by weight of the copolymer obtained according to the process described above. After leaving the mixer, the finished mixture has a temperature of about 100–120° C. Then 3 parts by weight of dicumyl peroxide and 0.3 part of sulfur are admixed on a laboratory calender at 40° C. for 10 minutes. The finished mixture is vulcanized on a steam-heated press at 160° C. for 30 min. The following mechanical test values are measured at 20° C. on the vulcanizate obtained:

Tensile strength (kg./sq. cm.) _____ 185
Elongation at break (percent) _____ 587
Modulus 300% _____ 82
Impact strength (notched) (kg./cm.) _____ 23
Resilience (percent) _____ 48
Hardness _____ 60
Permanent extension (percent after 15 min.) _____ 11

*Example 2*

Ethylene is copolymerized with propylene under the same test conditions as in Example 1, except that instead of n-heptane 0.9 l. of gasoline (boiling range 65–95° C.) is used as solvent, to which before the beginning of the polymerization 0.45 ml. (2 mmoles) of ethylaluminum sesquichloride and 3.2 ml. (20 mmoles) of hexachlorocyclopentadiene are added. As catalyst components, 0.5 mmole of the ethyl ester of monochloro-o-vanadic acid and 1.28 ml. (5.5 mmoles) of ethylaluminum sesquichloride, each dissolved in 100 ml. of gasoline, are dropped into the polymerization mixture over a period of 100 minutes. Total polymerization time is 140 minutes. Further treatment is as described in Example 1. In this way, 180 g. of copolymer with a viscosity $\eta$spec./c=2.3, measured at 135° in 0.1% decahydronaphthalene solution, is obtained. According to infrared-spectroscopic determination the product contains 35 mole percent of propylene and 65 mole percent of ethylene. The vulcanization was carried out as in Example 1. The resultant vulcanizate shows the following properties:

Tensile strength (kg./sq. cm.) _____ 190
Elongation at break (percent) _____ 500
Modulus 300% _____ 98
Impact strength (notched) (kg./cm.) _____ 22
Resilience (percent) _____ 49
Hardness _____ 65
Permanent extension (15 min. relaxation time) (percent) _____ 10

*Example 3*

Ethylene and propylene are copolymerized under the same conditions as in Example 1. After saturation with ethylene and propylene, 0.45 ml. (2 mmoles) of ethylaluminum sesquichloride and 6.4 ml. (40 mmoles) of hexachlorocyclopentadiene are added to 1.8 l. of n-heptane. The catalyst components used are 0.048 ml. (0.5 mmole) of $VOCl_3$ and 1.28 ml. (5.5 mmoles) of ethylaluminum sesquichloride, each in 100 ml. of n-heptane. Further treatment is the same as in Example 1. In this way 232 g. of a copolymer is obtained, which has a reduced specific viscosity of 2.6 and contains 33 mole percent of propylene and 67 mole percent of ethylene. The vulcanization was carried out as described in Example 1. The following values are measured on the vulcanizate obtained:

Tensile strength (kg./sq. cm.) _____ 198
Elongation at break (percent) _____ 330
Modulus 300% _____ 141
Impact strength (notched) (kg./cm.) _____ 15
Resilience (percent) _____ 50
Hardness _____ 72
Permanent extension (15 min. relaxation time) (percent) _____ 10

*Example 4*

Ethylene is copolymerized with propylene in the same way as in Example 1, except that instead of ethylaluminum sesquichloride, 0.5 ml. (4 mmoles) of diethylaluminum chloride and 3.2 ml. (20 mmoles) of hexachlorocyclopentadiene are added to 1.8 l. of n-heptane and 1 ml. (8 mmoles) of diethylaluminum chloride, 0.048 ml. (0.5 mmole) VOCl₃, and 3.2 ml. (20 mmoles) of hexachlorocyclopentadiene, each dissolved in 100 ml. of n-heptane, are used as catalyst components, which are uniformly dropped into the polymerization mixture over a period of 150 minutes. The whole is subjected to an after-polymerization of 40 minutes and treated further as described in Example 1. In this way, 235 g. of polymer was obtained which had a reduced specific viscosity of 1.9 and a propylene content of 40 mole percent. The vulcanization was carried out as described in Example 1. The following mechanical test values were measured on the vulcanizate:

| | |
|---|---|
| Tensile strength (kg./sq. cm.) | 161 |
| Elongation at break (percent) | 650 |
| Modulus 300% | 58 |
| Impact strength (notched) (kg./cm.) | 23 |
| Resilience (percent) | 47 |
| Hardness | 55 |
| Permanent extension (15 min. relaxation time) (percent) | 15 |

*Example 5*

As described in Example 1, ethylene was copolymerized with propylene. Before the start of the polymerization, 0.45 ml. (2 mmoles) of ethylaluminum sesquichloride was added to 1.8 l. of n-heptane, and 1.13 ml. (5 mmoles) of ethylaluminum sesquichloride, 0.14 ml. (0.5 mmole) of the isobutyl ester of o-vanadic acid and 6.4 ml. (40 mmoles) of hexachlorocyclopentadiene, each dissolved in 100 ml. of n-heptane, are used as catalyst components. Work-up consisted in stirring with water and removal of the n-heptane by steam distillation. In this way, 219 g. of copolymer was obtained which had a reduced specific viscosity of 2.3 and contained 36 mole percent of propylene.

*Example 6*

(a) As described in Example 1, 900 ml. of n-heptane was saturated with ethylene and propylene and then 0.28 ml. (2 mmoles) of triethylaluminum and 3.2 ml. (20 mmoles) of hexachlorocyclopentadiene were added. The catalyst components were 0.05 ml. (0.5 mmole) of VCl₄ and 0.56 ml. (4 mmoles) of triethylaluminum. In this way, 76 g. of copolymer with a reduced specific viscosity of 3.0 and a degree of crystallinity of 3% was obtained.

(b) Under otherwise the same test conditions as under (a), but using 1 mmole of the propyl ester of dichloro-o-vanadic acid and 1.12 ml. (8 mmoles) of triethylaluminum as catalyst components and 3.2 ml. (20 mmoles) of hexachlorocyclopentadiene, 119 g. of copolymer with a reduced specific viscosity of 1.4 with a propylene content of 36 mole percent and a degree of crystallinity of 2% was obtained.

*Example 7*

As described in Example 1, ethylene was copolymerized with propylene. The solvent consisted of 900 ml. of n-hexane, to which from the beginning of the polymerization 0.23 ml. (1 mmole) of ethylaluminum sesquichloride was added. The catalyst components were 0.5 mmole of the ethyl ester of dichloro-o-vanadic acid in 100 ml. of hexane, and a second solution containing 1.28 ml. (5.5 mmoles) of ethylaluminum sesquichloride and 3.2 ml. (20 mmoles) of hexachlorocyclopentadiene in 100 ml. of hexane. The reaction was heated for 30 minutes at 55° C. The copolymer yield was 173 g. The reduced specific viscosity of the product was 2.2 and the propylene content was found to be 35 mole percent.

*Example 8*

Ethylene was copolymerized with butene-1 in 900 ml. of cyclohexane, as described in Example 1. An amount of 0.048 ml. of VOCl₃ (0.5 mmole) was reacted with 0.05 ml. (0.5 mmole) of acetylacetone in 100 ml. of n-heptane, and the hydrogen chloride formed was driven out with nitrogen. A solution of acetylacetone vanadium oxydichloride was used as catalyst together with a solution of 1.28 ml. (5.5 mmoles) of ethylaluminum sesquichloride in 100 ml. of cyclohexane and a solution of 4 ml. (25 mmoles) of hexachlorocyclopentadiene in 100 ml. of cyclohexane. One hundred and nineteen (119) g. of copolymer was obtained which was treated further as described in Example 1. It had a reduced specific viscosity of 3.4 and a butene content of 27 mole percent.

*Example 9*

Using the procedure of Example 1, ethylene was copolymerized with propylene in 900 ml. of n-heptane. Prior to the beginning of the polymerization, 0.23 ml. (1 mmole) of ethylaluminum sesquichloride and 3.2 ml. (20 mmoles) of hexachlorocyclopentadiene were added to the n-heptane. The catalyst components were 0.1 mmole of the ethyl ester of dichloro-o-vanadic acid, 0.45 ml. (2 mmoles) of ethylaluminum sesquichloride, and 3.2 ml. (20 mmoles) of hexachlorocyclopentadiene, each dissolved in 100 ml. of n-heptane, and were added to the polymerization liquor over a period of 100 minutes. The polymerization required a total of 3 hours. Further treatment was the same as in Example 5. In this way, 118 g. of copolymer with a reduced specific viscosity of 2.9 and a propylene content of 35 mole percent was obtained.

*Example 10*

Ethylene was copolymerized with propylene as described in Example 1 in 1800 ml. toluene dried over sodium at 15° C. The catalyst components were 0.5 mmole of VOCl₃-tetrahydrofuran, 1.12 ml. (5 mmoles) of ethylaluminum sesquichloride, and 6.4 ml. (40 mmoles) of hexachlorocyclopentadiene, each dissolved in 100 ml. of toluene. After further treatment as described in Example 5, 160 g. of copolymer with a reduced specific viscosity of 3.8 and a propylene content of 42 mole percent was obtained.

*Example 11*

Ethylene was copolymerized with propylene under the same conditions as in Example 1. Before the beginning of the polymerization, 0.23 ml. (1 mmole) of ethylaluminum sesquichloride and 5 g. (17 mmoles) of 1,2,3,4,7,7-hexachlorobicyclo-[2,2,1]-heptadiene-(2,5) were added to 900 ml. of n-heptane saturated with ethylene and propylene. The catalyst components used were 1 mmole of the propyl ester of monochloro-o-vanadic acid, 0.67 ml. (3 mmoles) of ethylaluminum sesquichloride, and 18 g. of 1,2,3,4,7,7 - hexachlorobicyclo-[2,2,1]-heptadiene - (2,5), each in 100 ml. of n-heptane. Further treatment is as described in Example 1. In this way, 134 g. of copolymer with a reduced specific viscosity of 2.8 and a propylene content of 38 mole percent was obtained.

*Example 12*

As described in Example 1, ethylene was polymerized with propylene using 900 ml. of gasoline (boiling range 65–90°), to which 0.23 ml. of ethylaluminum sesquichloride was added prior to the beginning of the polymerization. The catalyst components used were 0.5 mmole of VOCl₃, 1.28 ml. (5.5 mmoles) of ethylaluminum sesquichloride, and 1.35 g. (5 mmoles) of 2,2,3,4,5,5-hexachlorocyclopentene-(3), each in 100 ml. of gasoline. After further treatment as described in Example 5, 106 g. of copolymer with a reduced specific viscosity of 1.6 and a propylene content of 40 mole percent was obtained.

*Example 13*

Ethylene was polymerized with propylene as described in Example 1 using 900 ml. of n-heptane to which 0.23 ml. (1 mmole) of ethylaluminum sesquichloride was added prior to the beginning of the polymerization. The catalyst components used were 0.5 mmole of the ethyl ester of dichloro-o-vanadic acid and 1.28 ml. (5.5 mmoles) of ethylaluminum sesquichloride, each dissolved in 100 ml. of n-heptane and were added to the polymerization batch over a period of 100 minutes. To increase the rate of polymerization, 1.5 g. (4 mmoles) of 2,3,4,5-tetrachloro - 2,5-dibromocyclopentene-(3) was dropped into the reaction solution over a period of 80 minutes. The total polymerization time was 2 hours. After further treatment as described in Example 1, 85 g. of copolymer with a reduced specific viscosity of 2.4 and a propylene content of 34 mole percent was obtained.

*Example 14*

After saturation of 900 ml. of n-heptane with a gas mixture consisting of 3 parts by volume of ethylene and 7 parts by volume of propylene, 4 g. of heptadiene-1,5 and 0.23 ml. (1 mmole) of ethylaluminum sesquichloride was added to the liquor at 30° C. Then solutions of 1 mmole of the ethyl ester of dichloro-o-vanadic acid, 1.28 ml. (5.5 mmoles) of ethylaluminum sesquichloride, 5.6 ml. (35 mmoles) of hexachlorocyclopentadiene, and 10 g. of heptadiene-1,5, in 100 ml. of n-heptane each were dropped into the polymerization liquor over a period of 100 minutes. As soon as the polymerization started, ethylene and propylene were introduced in a volume ratio of 2:1. After a total polymerization time of 120 minutes, the whole was treated further as described in Example 1. In this way, 85 g. of copolymer with a reduced specific viscosity of 1.4 and propylene content of 32 mole percent and an iodine number of 5 was obtained.

*Example 15*

After saturation of 1800 ml. of n-heptane with a gas mixture consisting of 3 parts by volume of ethylene and 7 parts by volume of propylene, 0.5 ml. (4 mmoles) of diethylaluminum monochloride and 6.4 ml. (40 mmoles) of hexachlorocyclopentadiene were added at 30° C. Then the solutions of 0.4 mmole of the butyl ester of dichloro-o-vanadic acid, 1 ml. (8 mmoles) of diethylaluminum chloride, and 6 g. of dicyclopentadiene, in 100 ml. of n-heptane each, are dropped separately into the polymerization liquor over a period of 100 minutes. Total polymerization time was 130 minutes. After further treatment as described in Example 1, 139 g. of copolymer with a reduced specific viscosity of 1.8, a propylene content of 36 mole percent, and an iodine number of 5 was obtained.

*Example 16*

(a) *Without hexachlorocyclopentadiene.*—A 5 l. vessel with stirrer was filled with 3 l. of n-hexane after careful drying with exclusion of air. The n-hexane was heated to 50° C. and saturated to 2 atmospheres of gas pressure, while passing through a mixture of 1 part by volume of ethylene and 4 parts by volume of propylene, the exhaust gases being led over a reflux condenser to avoid hexane losses. After saturation with ethylene and propylene, the blow-through valve was closed. Six g. of dicyclopentadiene was pumped in and the addition of the catalyst components by means of a dosing pump was started: 0.06 mmole of $VOCl_3$ and 30 mmoles of ethylaluminum sesquichloride, in 100 ml. of hexane solution each, were pumped in separately and uniformly over a period of 2 hours. The drop in pressure taking place immediately in the polymerization vessel was compensated by addition of ethylene and propylene in a volume ratio of 2:1, and dicyclopentadiene was pumped in to the extent that the molar ratio of the monomers added amounted to ethylene:propylene:dicyclopentadiene=2:1:0.02. The gas absorption reached a rate of about 30 liters per hour at a peak of about 70 liters per hour. For 2 hours alcoholic stabilization solution was added and the contents of the vessel steam-distilled. After drying, 105 g. of a colorless, amorphous copolymer was obtained containing 45% by weight of propylene and 3.1% by weight of dicyclopentadiene and having a reduced specific viscosity of 2.3.

(b) *With hexachlorocyclopentadiene.*—The procedure was the same as under (a) except that the 3 l. of n-hexane contained 8.1 g. of hexachlorocyclopentadiene. The gas absorption reached a rate of about 70 normal liters per hour with hardly any drop during the polymerization. The yield was 210 g. of colorless amorphous copolymer with 44% by weight of propylene and 3.4% by weight of dicyclopentadiene with a viscosity of $\eta sp./c.=2.4$. The steam-distilled product contained 1.1% Cl in the form of the monomeric hexachlorocyclopentadiene, which could be extracted, e.g., with isopropanol and acetone.

*Example 17*

*Continuous polymerization.*—A 5 l. vessel with stirrer was filled, after careful drying with exclusion of air, with 3 liters of hexane. The whole was then heated to 50° C. and saturated to 2 atmospheres of gas pressure by passing through a mixture of 1 part by volume of ethylene and 4 parts by volume of propylene, the exhaust gases being led over a reflux condenser to avoid hexane losses. After saturation, the blow-through valve was closed. Six g. of dicyclopentadiene was pumped in and 0.6 mmole of $VOCl_3$ and 30 mmoles of ethylaluminum sesquichloride, each in 100 ml. of hexane solution, were pumped in separately in a uniform manner over a period of 2 hours. The drop in pressure occurring immediately in the polymerization vessel was compensated by addition of ethylene and propylene in a volume ratio of 2:1 and dicyclopentadiene separately pumped in to such an extent that the molar ratio of the monomers was ethylene:propylene:dicyclopentadiene=2:1:0.02. After 2 hours the process was changed over to continuous operation. Hexane and the catalyst components were pumped in uniformly in the following amounts per hour: hexane-5.6 l., $VOCl_3$-1.2 mmoles in 200 ml. of hexane solution, ethylaluminum sesquichloride-60 mmoles in 200 ml. of hexane solution. The addition of monomer for the maintenance of the gas pressure of 2 atmospheres took place in a volume ratio of ethylene:propylene=1:2. The dicyclopentadiene was added in the molar ratio ethylene:propylene:dicyclopentadiene=1:2:0.02. The polymer solution was removed from the polymerization vessel so that the contents remained constant. After removal of the catalyst and solvent, 28–34 g. of copolymer was obtained over a period of 20 hours per 1 liter of polymer solution. The copolymer contained 42–46% by weight of propylene and 2.8–4.1% by weight of dicyclopentadiene and had a reduced specific viscosity of 1.8–2.3. With the same method of operation but with addition of 2.7 g. of hexachlorocyclopentadiene per liter of hexane, 58–73 g. of copolymer was obtained per liter of polymerizate solution. The copolymer contained 41–46% by weight of propylene and 3.0–4.5% by weight of dicyclopentadiene, and had a reduced specific viscosity of 1.7–2.6.

*Example 18*

Two liters of a mixture of paraffinic hydrocarbons boiling in the range of 180 to 200° C. was charged to a 1-gallon Sutherland reactor. The solvent was heated to 120° C. and saturated with ethylene to a pressure of 30 p.s.i.g. One mmole of ethylaluminum sesquichloride and 0.3 ml. of 0.02 M tertiarybutyl orthovanadate was then added. Following this, 0.16 ml. of hexachlorocyclopentene-3-one was added. A rapid polymerization began but stopped after several minutes while the pressure was kept constant by the addition of ethylene. A 0.1 M solution in the polymerization diluent of hexachlorocyclopentene-3-one was added at the rate of 3.7 ml./min. The addition of a solution of 0.4 M ethylaluminum sesquichloride was begun and the rate of addition was varied as required to maintain a polymerization rate of 1 liter of gas per minute. By this method it was possible to polymerize 110 liters of ethylene before the mixture became too viscous to stir efficiently. The solution was vented under pressure into a separate vessel, fitted with a stirrer and reflux condenser and containing 2 liters of n-heptane and 60 ml. of n-butanol. The resultant slurry was stirred for 1 hour at 70° C., filtered and washed with 4% sodium hydroxide for 1 hour at 60° C. The solid polymer was filtered, washed with water until neutral, and then dried. It weighed 100 g. and had a reduced specific viscosity of 3 and a density of 0.95.

When the process was repeated without the addition of hexachlorocyclopentene-3-one, it became necessary to add additional vanadium catalyst component to the reaction as it proceeded in order to maintain the same reaction rate, and it was necessary to terminate the reaction after 59 minutes because of higher polymer viscosity. A comparison of the amount of vanadium required in each run per minute of reaction shower the run with the halogen-containing promoter to have a vanadium efficiency 3,55 times the run without the promoter.

*Example 19*

Ethylene, propylene, and dicyclopentadiene were copolymerized using the general procedure of Example 16 using tetrachlorocyclopentene-2,4-dione as promoter. The use of this promoter gave a catalyst efficiency approximately 2.2 times that obtained without the use of a promoter.

In the process of the invention the molar ratio of halogen-containing promoter to vanadium compound is desirably from 10:1 to 100:1. However, even a larger ratio of the halogen-containing promoter, for example, up to 1000:1, can be employed. The molar ratio of vanadium compound to aluminum compound should be generally 1:3 to 1:30, although higher ratios up to 1:60 are operable. The amount of the catalyst components is generally very small, and usually lies from 0.05 to 1 mmole vanadium per liter of diluent.

What we claim and desire to protect by Letters Patent is:

1. In the polymerization or ethylene wherein ethylene is polymerized in an inert organic diluent in the presence of a catalyst prepared by reacting a vanadium compound soluble in the organic diluent with an organoaluminum compound, the improvement which comprises conducting the polymerization in the presence, as a catalyst promoter, of a promoting amount of an unsaturated carbocyclic compound containing at least 4 halogen atoms, at least 2 of which halogenated atoms are attached to doubly bound carbon atoms and at least 1 of which is attached to a singly bound carbon atom alpha to the double bond, the carbocyclic nucleus of said carbocyclic compound being selected from the group consisting of cyclopentadiene, cyclopentene, bicyclo(2,2,1)-heptadiene-2,5, cyclopentene-2-one, cyclopentene-3-one, and cyclopentene-2,4-dione.

2. The process of claim 1 in which the carbocyclic compound is hexachlorocyclopentadiene.

3. The process of claim 1 in which the carbocyclic compound is 2,2,3,4,5,5-hexachlorocyclopentene.

4. The process of claim 1 in which the carbocyclic compound is 2,3,4,5-tetrachloro - 2,5 - dibromocyclopentene.

5. The process of claim 1 in which the carbocyclic compound is 1,2,3,4,7,7-hexachlorobicyclo(2,2,1)-heptadiene-2,5.

6. The process of claim 1 in which the carbocyclic compound is hexachlorocyclopentene-2-one.

7. The process of claim 1 in which the carbocyclic compound is hexachlorocyclopentene-3-one.

8. The process of claim 1 in which the carbocyclic compound is tetrachlorocyclopentene-2,4-dione.

9. The process of claim 1 in which the molar ratio of carbocyclic compound to vanadium compound is from 10:1 to 1000:1.

10. The process of claim 1 in which ethylene is copolymerized with propylene and a diene.

References Cited

UNITED STATES PATENTS

| | | | |
|---|---|---|---|
| 3,101,327 | 8/1963 | Lyons | 260—88.2 |
| 3,101,328 | 8/1963 | Edmonds | 260—93.7 |
| 3,210,332 | 10/1965 | Lyons | 260—93.7 |
| 3,222,330 | 12/1965 | Nyce et al. | 260—80.5 |

JOSEPH L. SCHOFER, *Primary Examiner.*

M. B. KURTZMAN, *Assistant Examiner.*